April 26, 1938.
C. C. FARMER
2,115,552
VEHICLE BRAKE SYSTEM
Filed Aug. 19, 1937
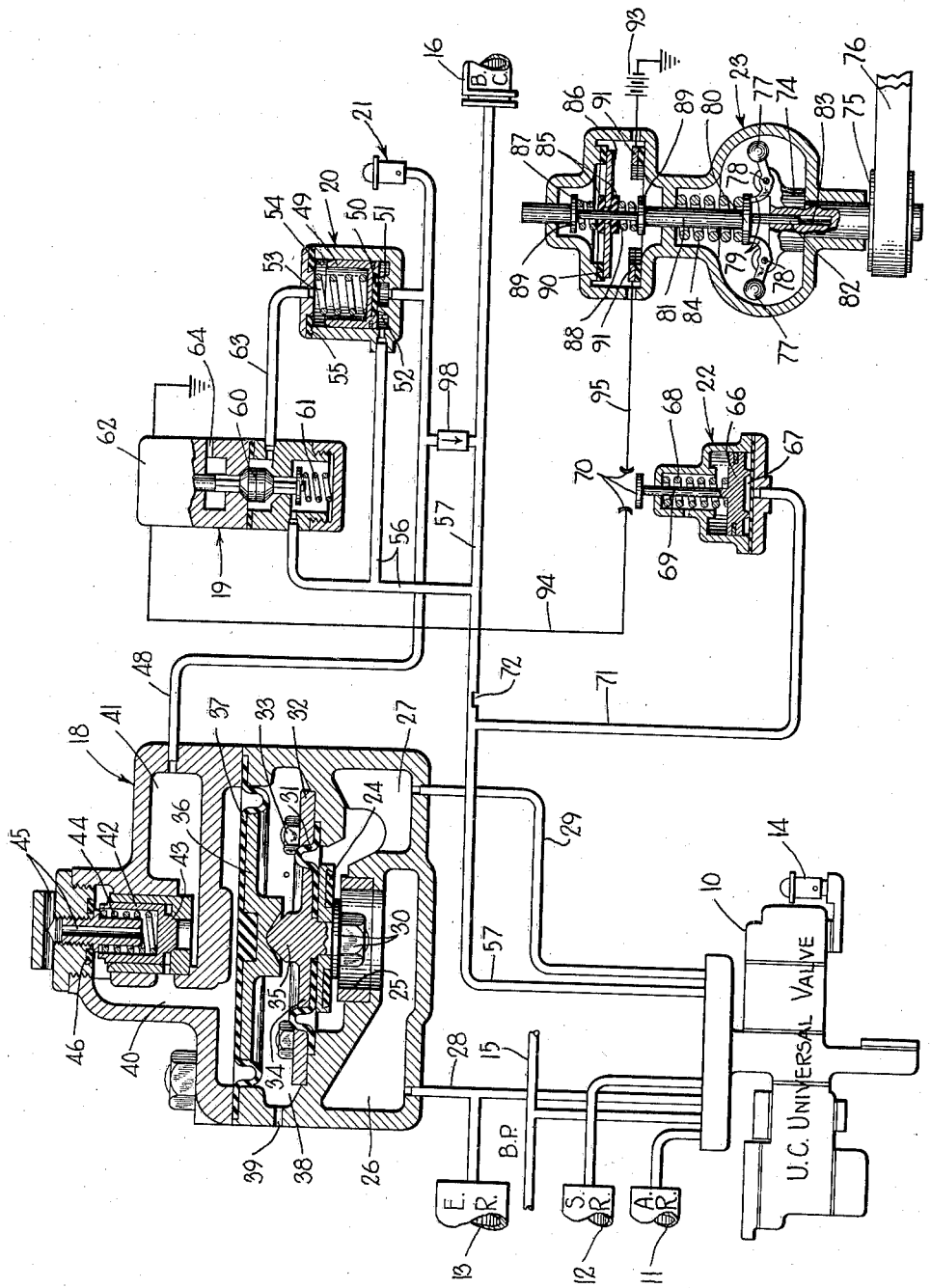
INVENTOR
CLYDE C. FARMER
BY *Wm. M. Cady*
ATTORNEY Patented Apr. 26, 1938

2,115,552

UNITED STATES PATENT OFFICE 2,115,552

VEHICLE BRAKE SYSTEM

Clyde C. Farmer, Pittsburgh, Pa., assignor to The Westinghouse Air Brake Company, Wilmerding, Pa., a corporation of Pennsylvania Application August 19, 1937, Serial No. 159,845

15 Claims. (Cl. 303—21)

This invention relates to vehicle brake systems, and in particular to brake systems for railway trains in which the degree of braking is controlled with relation to the speed of the train.

When the brakes on a train are applied to a maximum degree at a time when the train is traveling at a high speed, the degree of the brake application must be diminished as the train speed reduces or otherwise wheel sliding may result. This is due to the fact that the coefficient of friction between the brake shoes and the wheel treads increases as the train speed diminishes. From actual experience and tests it has been determined that when the brakes are applied to a relatively high degree at a high speed, this degree may be maintained until the train speed has diminished to some predetermined value, at which time the danger of wheel sliding increases rapidly, and it is, therefore, necessary to promptly reduce the degree of the application if wheel sliding is to be avoided.

The degree of the brake application can, of course, be reduced by manual manipulation of the brake valve, or it can be accomplished by some form of automatic means. The automatic means is to be preferred, particularly if it is made supplemental to the manual control; that is to say, it is desirable that automatic means be provided to reduce the degree of the brake application at some predetermined train speed, with however provision being made so that the operator may independently reduce the degree of the application as his judgment dictates, without interference from the automatic means.

With the foregoing considerations in mind, it is a principal object of the present invention to provide a brake apparatus in which automatic means are included for reducing the degree of the brake application when the train speed has diminished to a predetermined low value.

The most commonly used brake equipment on standard vehicles for passenger service is that known as the type "UC" equipment, employing the well known universal valve device. In this equipment the parts are so arranged that during a service application of the brakes the degree of brake cylinder pressure is limited to a value which is unlikely to produce wheel sliding at the lower train speeds. However, when an emergency application of the brakes is effected the degree of the application is greatly increased, so that the danger of wheel sliding at the lower speeds increases.

It is a further object of the present invention to provide automatic means which is particularly adaptable to the type "UC" brake equipment for automatically reducing the degree of an emergency brake application when the train speed reduces to a predetermined or chosen low value.

In adapting the invention to the type "UC" brake equipment, I have in mind certain other specific objects, which will be apparent and fully understood from the following description of an embodiment of the invention, which is illustrated in the single figure of the attached drawing. This figure shows an adaptation of the invention in connection with a well known type "UC" universal valve device.

The type "UC" universal valve device is so well known as to not require a detailed description thereof. The complete type "UC" equipment is fully illustrated and described in Instruction Pamphlet No. 5050-4 (issue of July, 1931) published by The Westinghouse Air Brake Company, Pittsburgh, Pa., assignee of this application.

In the drawing, the "UC" universal valve device has been designated by the numeral 10, as having connected thereto an auxiliary reservoir 11, a service reservoir 12, and an emergency reservoir 13. Forming a part of the universal valve device is a safety valve device 14. As is well understood, the universal valve device is connected to the brake pipe which extends throughout the train, here shown in fragmentary form and designated by the numeral 15.

Briefly stated, the universal valve device operates upon a service reduction in brake pipe pressure to supply fluid under pressure from both the auxiliary reservoir 11 and service reservoir 12 to a connected brake cylinder, here designated by the numeral 16, to effect a service application of the brakes. The degree of brake cylinder pressure is limited during a service application by the safety valve device 14.

When the brake pipe pressure is reduced at an emergency rate, to effect an emergency application of the brakes, the universal valve device 10 operates to supply fluid under pressure from all three reservoirs 11, 12 and 13 to the brake cylinder 16, and during an emergency application the safety valve device 14 is ineffective to control brake cylinder pressure. This, of course, means that the degree of brake cylinder pressure is considerably higher than the permissible degree during a service application.

When, following either a service or an emergency application of the brakes, the brake pipe is recharged, the universal valve device operates to release fluid under pressure from the brake cylinder 16 and to recharge the connected reservoirs from the brake pipe.

In adapting the invention to the type "UC" brake equipment, I have provided, as illustrated, a cut-off valve device 18, a magnet valve device 19, a piston type valve device 20, a safety valve device 21, a switch device 22, and a speed controlled switch device 23.

Considering now in detail the parts just enumerated, the cut-off valve device 18 is embodied in a casing having disposed therein a valve 24, which coacts with a valve seat 25 to control communication between two chambers 26 and 27. The chamber 26 is connected to the emergency reservoir 13 by way of pipe 28, while the chamber 27 is open to pipe 29 which leads to the universal valve device 10. This communication from the emergency reservoir to the universal valve device is that through which fluid under pressure is drawn during an emergency application of the brakes.

It will be observed that the pipe 28 also leads from the emergency reservoir to the universal valve device, but this connection is provided to make emergency reservoir pressure available at the rear side of the release piston, so that graduated release may be effected during service applications of the brakes. The cut-off valve device 18, therefore, controls the communication between the emergency reservoir and the universal valve device through which fluid is supplied during emergency applications.

In the cut-off valve device the valve 24 is attached by washer and nuts 30 to a flexible diaphragm 31, which diaphragm is secured to the casing of the valve device by ring 32 and bolts and nuts 33. The diaphragm is provided with follower plate 34 having an upwardly extending projection 35. This projection engages a follower plate 36 attached to a second flexible diaphragm 37 also secured in the casing of the valve device. The two diaphragms 37 and 31 form therebetween a chamber 38 which is always open to the atmosphere by way of port 39.

The diaphragm 37 forms with the casing of the valve device another chamber 40, which may be either in communication with the atmosphere or with a supply chamber 41, depending upon the position of a valve 42. The valve 42 is urged toward a lower seat 43 by a spring 44. When the valve 42 is on the lower seat, communication is established between the chamber 40 and the atmosphere past the upper edge of the valve 42 and through passages 45. When fluid under pressure is supplied to chamber 41 to a predetermined degree, this pressure acting on the area of valve 42 within the seat 43 forces the valve upwardly until its upper edge seats upon an upper seat 46. In this position of the valve communication between chamber 40 and the atmosphere is closed, and chamber 40 is connected to chamber 41. When the pressure in chamber 41 is subsequently reduced below the said predetermined value, the spring 44 will force the valve 42 to its lower seat, thus again opening chamber 40 to the atmosphere. The chamber 41 is connected to a pipe 48 which leads to both the valve device 20 and to the safety valve device 21.

The safety valve device 21 may be considered to be of conventional design, its function being to limit the pressure of fluid in pipe 48, and the connected volumes, to a predetermined value, according to its setting.

The valve device 20 is embodied in a casing having disposed therein a piston type valve 49. This valve is provided on its face with a gasket 50 which is adapted to seat upon a seat rib 51. When the valve is thus seated a chamber 52 is formed outside of the seat rib. A spring 53, disposed in chamber 54 above the valve 49, urges the valve toward the seat rib 51.

When the pressure in chambers 52 and 54 are substantially equal, or differ less than by a predetermined amount, the spring 53 will hold the valve 49 upon the seat rib 51. When, however, the pressure in chamber 52 exceeds the pressure in chamber 54 by a certain amount the valve 49 will be lifted from the seat rib 51 and urged upwardly until it seals against a gasket 55. When the valve 49 is in this upper position the aforementioned pipe 48 is connected to a pipe 56 which is in open communication with pipe 57 leading to the brake cylinder 16. It will be also observed that the pipe 57 connects with the universal valve device 10, and is the pipe through which the universal valve device supplies fluid under pressure to the brake cylinder.

Considering now the magnet valve device 19, this device is embodied in a casing having disposed therein a double beat valve 60, which is urged toward an upper seated position by a spring 61, and which is actuated to a lower seated position by an electromagnet 62 when energized.

When the double beat valve is in its upper seated position, as illustrated, communication is established between the aforementioned pipe 56 and a pipe 63 leading to the aforementioned chamber 54 in the valve device 20. When the double beat valve 60 is actuated to its lower seated position, this communication is closed and communication is established between the pipe 63 and the atmosphere by way of port 64.

The switch device 22 is embodied in a casing having disposed therein a piston 66, which is subject on its lowermost side to pressure of fluid in chamber 67, and on its uppermost side to pressure exerted by a spring 68. Attached to the piston 66 is a stem 69 which carries insulated therefrom one member of a set of contacts 70. When the piston 66 is in its lower position, as illustrated, the contacts 70 are open, and when the piston 66 is actuated upwardly, as upon the supply of fluid to chamber 67 at a low pressure, the contacts 70 will be closed. The chamber 67 is connected to the brake cylinder pipe 57 by branch pipe 71.

It will be observed that a choke or restriction 72 is disposed in the brake cylinder pipe 57, and that the pipe 71 connects to the brake cylinder pipe on the universal valve side of this choke or restriction. The purpose of this will be made clear later.

Considering now the speed controlled switch device 23, this device comprises a rotatable member 74 having attached thereto a pulley 75 which may be driven by a belt 76 attached to a vehicle axle, or other part which rotates at a speed corresponding to vehicle speed. While a pulley and belt have been shown, it will be obvious that a sprocket and chain, or other driving mechanism may be employed.

Carried by the rotatable member 74 are two centrifugal weights 77. These weights are provided with arms pivotally connected to the rotatable members 74 and 78. The arms are curved as shown at 79, and engage a flange or collar 80 secured to a stem 81. The stem 81 is provided with an extension 82 which is slidable in a bore 83 in the rotatable member 74. A spring 84 reacts between the casing and the flange 80 to urge the stem 81 downwardly. However, when the rotatable member 74 is rotating above a chosen speed the centrifugal force acting on the weights 78 causes the arms 79 to engage the flange 80 with sufficient force to shift the stem 81 upwardly.

Carried by the stem 81 and insulated therefrom by insulating members 85 is a movable contact 86, which may be in the form of a bar or ring. The supporting means for the contact 86 comprises two springs 87 and 88 which are positioned between flanges or collars 89 on the stem 81 in a manner such that contact 86 may move in an axial direction with respect to the stem.

When the stem 81 is actuated upwardly the contact 86 is positioned against an insulating stop 90. When, however, due to the rotation of the rotatable member 74 diminishing to or below said chosen or predetermined speed, the stem 81 is shifted downwardly the contact 86 will engage and connect together two stationary contacts 91.

As will be apparent, therefore, the speed controlled switch device 23 will maintain the contacts 91 open so long as the vehicle speed is above a predetermined value, but when the speed drops to or below this value, the contacts 91 will be closed.

Operation

Considering now the operation of the embodiment disclosed, when the brake pipe 15 is maintained charged to its normal value, the universal valve device 10 will maintain the brake cylinder 16 connected to an exhaust port therein, while at the same time charging the three reservoirs 11, 12 and 13 from the brake pipe. The brakes will thus be released.

Assuming that the vehicle or train is traveling at a speed above a predetermined low speed, which, for example, will be taken as twenty-five miles per hour, the parts of the speed controlled switch device 23 will be in the position illustrated.

Assuming now that it is desired to effect an emergency application of the brakes, brake pipe pressure will be reduced at an emergency rate, whereupon the universal valve device will operate in the well known manner to supply fluid under pressure from the three reservoirs 11, 12 and 13 to the brake cylinder 16, and will during the application maintain open communication therebetween. Flow to the brake cylinder will be through the choke or restriction 72, while flow to the switch device 22 will be unrestricted. One purpose of the choke or restriction 72 is to reduce the rate of increase of brake cylinder pressure so that the switch device 22 will close its contacts 70 before the high brake cylinder pressure has been established. This is for the purpose of insuring that the circuit controlled by the switch device 22 will be closed before excessive brake cylinder pressure has been established.

Fluid under pressure flowing to the brake cylinder also flows to the two chambers 52 and 54 in the valve device 20. It will be observed that flow to the chamber 54 is through the magnet valve device 19. Due to this fact and also to the fact that the chamber 54 is larger than the chamber 52, if fluid is permitted to flow rapidly to these chambers the pressure in chamber 52 may build up more rapidly than that in chamber 54 and thus unseat the valve 49 for a short interval of time. During this interval fluid may flow from the pipe 56 to the pipe 48 and thus to the cut-off valve device 18, and may rise to a value high enough to unseat the valve 42 and flow to the chamber 40. Pressure in the chamber 40 acting upon the diaphragm 37 will flex this diaphragm downwardly and thereby actuate the valve 24 to its seat 25.

The seating of the valve 24 closes communication between the emergency reservoir 13 and the universal valve device 10, so that with the emergency reservoir isolated full pressure cannot be developed in the brake cylinder as required for an emergency application. This would mean that the emergency reservoir is isolated from the universal valve device at a time when it is most needed. To prevent this unintentional or accidental isolation of the emergency reservoir, the valve device 20 is connected to the brake cylinder pipe 57 on the brake cylinder side of the choke or restriction 72. The choke then retards the flow of fluid not only to the brake cylinder 16 but also to the valve device 20, so that the pressure in the two chambers 52 and 54 build up more nearly at the same rate, and as a consequence the valve 49 will not be lifted from the seat rib 51 at an undesired time.

Now assuming that the emergency application has been effected, with a maximum brake cylinder pressure having been established by supply from the three reservoirs 11, 12, and 13, the speed of the vehicle or train will diminish rapidly due to this brake application. When the speed has reduced to the point where the contacts 91 of the speed controlled switch device 23 are closed, as for example the 25 miles per hour assumed, the magnet valve device 19 will be connected to a battery 93, by way of conductor 94, contacts 70 of switch device 22, and conductor 95, it being observed that the magnet valve device has one terminal thereof grounded as does the battery 93.

The electromagnet 62 of the magnet valve device 19 will be thus energized and will shift the double beat valve 60 to its lower seated position. This closes communication between the chamber 54 and the brake cylinder pipe 57, and opens the chamber 54 to the atmosphere by way of port 64. As soon as the pressure in chamber 54 has diminished to a low value the pressure in chamber 52 will shift the valve 49 from its seat 51 to its upper position against the gasket 55. Communication will then be established between the brake cylinder 16 and the chamber 41 in the cut-off valve device 18, and also between the brake cylinder and the safety valve device 21. Brake cylinder pressure will be eventually reduced to a value according to the setting of the safety valve device, which is a value at which wheel sliding is unlikely to occur.

The pressure of fluid in the chamber 41 will shift the valve 42 to its upper seated position, and thus establish pressure in the chamber 40. This pressure will flex the diaphragm 37 downwardly to seat the valve 24, as before described, and thus isolate the emergency reservoir 13 from the universal valve device 10. This operation takes place rapidly enough so that the emergency reservoir is isolated before brake cylinder pressure has been reduced to the low value according to the setting of the safety valve device 21. The pressure in the emergency reservoir is thus not reduced in accordance with reduction in brake cylinder pressure, but is maintained so as to provide a reserve pressure if later needed. Since the service and auxiliary reservoirs are maintained in communication with the brake cylinder the pressure therein falls with brake cylinder pressure.

Another reason for isolating the emergency reservoir at this time is to permit the brake cylinder pressure to be more promptly reduced to the setting of the safety valve device 21. The emergency reservoir is a large reservoir, relative to the auxiliary and supply reservoirs, and since during an emergency application it is maintained connected to the brake cylinder, it will be apparent that a longer time will be required to reduce the pressure in both the brake cylinder and the three reservoirs than is required to reduce the pressure in the brake cylinder and service and auxiliary reservoirs alone. By isolating the emergency reservoir the time required to reduce brake cylinder pressure is thus greatly shortened.

A still further reason for isolating the emergency reservoir is to conserve air pressure and thus reduce the charging time required following release of the application. This will also ensure a more prompt release of the brakes.

With the brake cylinder pressure thus reduced at the low vehicle speed the danger of wheel sliding is greatly minimized, while at the same time sufficient braking force is produced to insure that the train or vehicle will be brought to a stop promptly.

When the brakes are subsequently released, the venting of the brake cylinder also vents chamber 67 in the switch device 22, and as this switch device opens its contacts 70 the magnet valve device 19 will be deenergized, thus equalizing the pressure in the two chambers 52 and 54 so that valve 49 will be seated upon seat rib 51. This will disconnect the brake cylinder pipe 57 from the chamber 41 in the cut-off valve device 18, and from the safety valve device 21. Fluid under pressure in the chamber 41, as well as that in pipe 48, will be released to the brake cylinder pipe 57 by the one-way check valve device 98, which as will be observed from the arrow thereon permits flow only from pipe 48 to the pipe 57, and prevents flow in the opposite direction.

As soon as the pressure in chamber 41 has dropped to a low value valve 42 moves to its lower seat, thus venting chamber 40 to the atmosphere. As a result, the valve 24 will move to unseated position, thus placing the emergency reservoir 13 again in communication with the universal valve device 10, so that it may be recharged during the recharging operation. Since the emergency reservoir has not been reduced to the low value corresponding to the setting of the safety valve device 21, it follows that the recharging time will be greatly reduced.

While I have illustrated and described my invention in connection with one specific embodiment thereof, it is not my intention to be limited to the specific details of this embodiment or otherwise than according to the spirit and scope of the appended claims.

Having now described my invention, what I claim as new and desire to secure by Letters Patent, is:

1. In a vehicle brake system, in combination, a brake cylinder, a plurality of reservoirs one of which is an emergency reservoir, a brake controlling valve device operable during an emergency application of the brakes to supply fluid under pressure from all of said reservoirs to said brake cylinder, and means controlled by the speed of the vehicle and operable at a predetermined speed to close communication between said emergency reservoir and said brake controlling valve device.

2. In a vehicle brake system, in combination, a brake cylinder, a plurality of reservoirs one of which is an emergency reservoir, a brake controlling valve device operable during an emergency application of the brakes to supply fluid under pressure from all of said reservoirs to said brake cylinder, a valve device operable upon an increase in pressure to close communication between said emergency reservoir and said brake controlling valve device, and means operable at a predetermined speed of the vehicle for supplying fluid under pressure to operate said valve device.

3. In a vehicle brake system, in combination, a brake cylinder, a plurality of reservoirs one of which is an emergency reservoir, a brake controlling valve device operable during an emergency application of the brakes to open and maintain communication between said reservoirs and said brake cylinder, a cut-off valve device operable upon an increase of fluid pressure therein for closing communication between said emergency reservoir and said brake controlling valve device, means operated according to the speed of the vehicle, and electroresponsive means controlled by said speed controlled means and operative at a predetermined vehicle speed to effect a supply of fluid under pressure to said cut-off valve device.

4. In a vehicle brake system, in combination, a brake cylinder, a plurality of reservoirs one of which is an emergency reservoir, a brake controlling valve device operable during an emergency application of the brakes to open and maintain communication between said reservoirs and said brake cylinder, means responsive to the speed of the vehicle and operative at a predetermined vehicle speed to effect a reduction in brake cylinder pressure, and means also operative at said predetermined speed to close communication between said emergency reservoir and said brake controlling valve device.

5. In a vehicle brake system, in combination, a brake cylinder, a plurality of reservoirs one of which is an emergency reservoir, a brake controlling valve device operative during an emergency application of the brakes to maintain communication between said reservoirs and said brake cylinder, a cut-off valve device having a chamber and operable upon supply of fluid under pressure to said chamber to close communication between said emergency reservoir and said brake controlling valve device, a pressure limiting valve device, and means operable at a predetermined vehicle speed to connect said brake cylinder to said pressure limiting valve device and to the chamber in said cut-off valve device.

6. In a vehicle brake system, in combination, a brake cylinder, a plurality of reservoirs, a brake controlling valve device operative during an emergency application of the brakes to maintain communication between said plurality of reservoirs and said brake cylinder, cut-off valve device operative upon supply of fluid under pressure to a chamber therein to close communication between one of said reservoirs and said brake controlling valve device, a pressure limiting valve device, means operative at a predetermined vehicle speed for connecting said brake cylinder to said pressure limiting valve device, and means also operative at said predetermined speed to supply fluid at brake cylinder pressure to said chamber in said cut-off valve device.

7. In a vehicle brake system, in combination, a brake cylinder, a plurality of reservoirs, a brake controlling valve device operative during an emergency application of the brakes to open communication between said plurality of reservoirs and said brake cylinder, means operative at a predetermined vehicle speed to close communication between one of said reservoirs and said brake controlling valve device, and means controlled by brake cylinder pressure for controlling said last means.

8. In a vehicle brake system, in combination, a brake cylinder, a reservoir, a brake controlling valve device operable during an emergency application of the brakes to maintain communication between said reservoir and said brake cylinder, electrical means operative upon a variation in the electrical condition thereof to isolate said reservoir from said brake controlling valve device, and means operative at a predetermined vehicle speed to cause said variation in the electrical condition of said electrical means.

9. In a vehicle brake system, in combination, a brake cylinder, a reservoir, means operative during an emergency application of the brakes for opening and maintaining communication between said reservoir and brake cylinder, a set of contacts adapted to close only at or below a predetermined vehicle speed, and means responsive to the closing of said contacts for connecting said brake cylinder to a pressure reducing device and for at the same time closing communication between said reservoir and said first named means.

10. In a vehicle brake system, in combination, a brake cylinder, a plurality of reservoirs one of which is an emergency reservoir, a brake controlling valve device operative when effecting an emergency application of the brakes to open communication between said reservoirs and said brake cylinder, a cut-off valve device operative upon supply of fluid under pressure thereto to close communication between said emergency reservoir and said brake cylinder, a pressure limiting valve device, valve means operative upon a decrease of pressure in a chamber therein to connect said brake cylinder to said pressure limiting valve device and to at the same time supply fluid under pressure to said cut-off valve device, and speed controlled means operative at a predetermined vehicle speed to reduce the pressure of fluid in said valve means.

11. In a vehicle brake system, in combination, a brake cylinder, means for establishing a communication through which fluid under pressure is supplied to said brake cylinder, a pressure limiting valve device, valve means operated upon an unbalance of fluid pressures therein to connect said brake cylinder communication to said pressure limiting valve device, and means for controlling the rate of flow of fluid under pressure to both said brake cylinder and said valve means whereby to prevent the said unbalance of fluid pressures in said valve means at undesired times.

12. In a vehicle brake system, in combination, a brake cylinder, means for establishing communication through which fluid under pressure is supplied to said brake cylinder, a pressure limiting valve device, an electric circuit, means operative upon energization of said circuit for connecting said brake cylinder to said pressure limiting valve device, a fluid pressure operated switch device connected to said brake cylinder communication and operable upon supply of fluid under pressure to said communication to control said electric circuit, and means disposed in said brake cylinder communication for causing the pressure in said brake cylinder to be increased at a rate different from the pressure increase in said switch device.

13. In a vehicle brake system, in combination, a brake cylinder, a plurality of reservoirs, a brake controlling valve device operative during an emergency application of the brakes to maintain communication between said plurality of reservoirs and said brake cylinder, an electric circuit, means operative upon energization of said circuit for closing communication between one of said reservoirs and said brake controlling valve device, speed controlled switch means for controlling said circuit, and a switch device operated by brake cylinder pressure for also controlling said circuit.

14. In a vehicle brake system, in combination, a brake cylinder, a plurality of reservoirs one of which is an emergency reservoir, a brake controlling valve device operative during an emergency application of the brakes to open communication between said reservoirs and said brake cylinder, a cut-off valve device operative upon supply of fluid under pressure thereto to close communication between said emergency reservoir and said brake controlling valve device, a pressure limiting valve device, valve means operative upon a decrease of pressure therein to connect said brake cylinder to said pressure limiting valve device and to supply fluid at brake cylinder pressure to said cut-off valve device, a magnet valve device operable when energized to effect a decrease of pressure in said valve means, and a speed controlled switch device operative at a predetermined vehicle speed to effect the energization of said magnet valve device.

15. In a vehicle brake system, in combination, a brake cylinder, a plurality of reservoirs one of which is an emergency reservoir, a brake controlling valve device operative during an emergency application of the brakes to open communication between said reservoirs and said brake cylinder, a cut-off valve device operative upon supply of fluid under pressure thereto to close communication between said emergency reservoir and said brake controlling valve device, a pressure limiting valve device, valve means operative upon a decrease of pressure therein to connect said brake cylinder to said pressure limiting valve device and to supply fluid at brake cylinder pressure to said cut-off valve device, a magnet valve device operable when energized to effect a decrease of pressure in said valve means, and means controlled both by brake cylinder pressure and the speed of the vehicle for controlling the energization of said magnet valve device.

CLYDE C. FARMER.